United States Patent
Kim et al.

(10) Patent No.: US 10,217,434 B2
(45) Date of Patent: *Feb. 26, 2019

(54) DISPLAY DEVICE AND DRIVING METHOD THEREOF

(71) Applicant: Samsung Display Co., Ltd., Yongin-si, Gyeonggi-do (KR)

(72) Inventors: Dong-Gyu Kim, Yongin-Si (KR); Seong-Young Lee, Anyang-Si (KR); Sahng-Ik Jun, Yongin-Si (KR); Sung-Jae Moon, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,879

(22) Filed: Jan. 11, 2018

(65) Prior Publication Data

US 2018/0130440 A1 May 10, 2018

Related U.S. Application Data

(63) Continuation of application No. 15/389,902, filed on Dec. 23, 2016, now Pat. No. 9,905,191, which is a
(Continued)

(30) Foreign Application Priority Data

Jul. 25, 2007 (KR) .................. 10-2007-0074466
May 30, 2014 (KR) .................. 10-2014-0066116

(51) Int. Cl.
*G09G 3/36* (2006.01)
*G02F 1/133* (2006.01)
(Continued)

(52) U.S. Cl.
CPC ......... *G09G 3/3696* (2013.01); *G02F 1/1368* (2013.01); *G02F 1/13306* (2013.01);
(Continued)

(58) Field of Classification Search
CPC .......... G09G 3/36–3/3696; G09G 2300/0421; G09G 2300/0426; G09G 2300/0443;
(Continued)

(56) References Cited

U.S. PATENT DOCUMENTS 7,068,330 B2   6/2006   Song et al.
7,158,105 B2   1/2007   Miyazawa
(Continued)

FOREIGN PATENT DOCUMENTS

JP   11-175037    7/1999
JP   2002296617   10/2002
(Continued)

*Primary Examiner* — Stephen G Sherman
(74) *Attorney, Agent, or Firm* — Innovation Counsel LLP

(57) ABSTRACT

A display device and a driving method therefor includes a plurality of unit pixels arranged in a matrix form, a plurality of gate lines extending in a row direction and connected to the unit pixels, respectively, pluralities of first and second data lines extending in a column direction and connected to the unit pixels, respectively, a plurality of charge control lines extending in the row direction and connected to the unit pixels, respectively, a plurality of gate connection lines connected to at least two adjacent gate lines, respectively, and a plurality of charge connection lines connected to at least two adjacent charge control lines, respectively.

11 Claims, 13 Drawing Sheets

Related U.S. Application Data continuation of application No. 14/566,578, filed on Dec. 10, 2014, now Pat. No. 9,529,237, which is a continuation of application No. 12/145,416, filed on Jun. 24, 2008, now Pat. No. 8,952,877.

(51) Int. Cl.
  *G02F 1/1362* (2006.01)
  *G02F 1/1343* (2006.01)
  *G02F 1/1368* (2006.01)
  *G02F 1/1333* (2006.01)

(52) U.S. Cl.
  CPC .. *G02F 1/134336* (2013.01); *G02F 1/136286* (2013.01); *G09G 3/3659* (2013.01); *G09G 3/3688* (2013.01); *G02F 1/133345* (2013.01); *G02F 2001/134345* (2013.01); *G09G 2300/0426* (2013.01); *G09G 2300/0443* (2013.01); *G09G 2300/0852* (2013.01); *G09G 2310/0205* (2013.01); *G09G 2310/0251* (2013.01); *G09G 2320/0257* (2013.01)

(58) Field of Classification Search
  CPC ... G09G 2300/0852; G09G 2310/0205; G09G 2300/0439–2300/0465; G02F 1/136286
  USPC ....... 345/76–83, 87–104, 204, 690; 349/139, 349/143, 149
  See application file for complete search history.

(56) References Cited

U.S. PATENT DOCUMENTS

| | | | |
|---|---|---|---|
| 7,944,515 | B2 | 5/2011 | Song |
| 9,905,191 | B2 * | 2/2018 | Kim ................ G02F 1/136286 |
| 2003/0151572 | A1 | 8/2003 | Kumada et al. |
| 2003/0218586 | A1 | 11/2003 | Wu et al. |
| 2004/0012744 | A1 | 1/2004 | Ishige et al. |
| 2004/0119672 | A1 | 6/2004 | Lee et al. |
| 2004/0252249 | A1 | 12/2004 | Hong |
| 2005/0036091 | A1 | 2/2005 | Song |
| 2005/0195177 | A1 | 9/2005 | Tai |
| 2005/0225523 | A1 | 10/2005 | Park |
| 2006/0066798 | A1 | 3/2006 | Hwang et al. |
| 2006/0221033 | A1 | 10/2006 | Yasuda et al. |
| 2006/0262263 | A1 | 11/2006 | Yang et al. |
| 2007/0126941 | A1 | 6/2007 | Cheng |
| 2007/0182885 | A1 | 8/2007 | Egi et al. |
| 2008/0024709 | A1 | 1/2008 | Moon |

FOREIGN PATENT DOCUMENTS

| | | |
|---|---|---|
| KR | 10-2002-0009900 | 2/2002 |
| KR | 10-0637529 | 10/2006 |

* cited by examiner

DISPLAY DEVICE AND DRIVING METHOD THEREOF

CROSS-REFERENCE TO RELATED APPLICATION

This application is a continuation of U.S. patent application Ser. No. 15/389,902 filed on Dec. 23, 2016, which is a continuation application of U.S. patent application Ser. No. 14/566,578 filed on Dec. 10, 2014, which is a continuation application of U.S. patent application Ser. No. 12/145,416 filed on Jun. 24, 2008, which claims priority to Korean Divisional Patent Application No. 10-2014-0066116 filed on May 30, 2014, and the parent Korean Patent Application No. 10-2007-0074466 filed on Jul. 25, 2007, and all the benefits accruing therefrom under 35 U.S.C. § 119, the contents of which are incorporated by reference in their entirety.

BACKGROUND

The present disclosure relates to a display device, and more particularly, to a liquid crystal display device capable of reducing afterimage and improving visibility.

In general, liquid crystal display (LCD) devices are being actively developed due to their several advantages such as small size, light weight and large screen compared to typical cathode ray tubes (CRTs). The LCDs display an image using a plurality of unit pixels, each including a thin film transistor (TFT) and a liquid crystal capacitor.

The liquid crystal capacitor includes a pixel electrode, a common electrode, and liquid crystals disposed therebetween. In LCDs, an electric field between the pixel electrode and the common electrode is changed by supplying external charges, i.e., a data signal, to the pixel electrode though the TFT. Such a change in electric field changes the orientation of liquid crystal molecules, and thus the quantity of light transmitting the liquid crystal molecules is changed, so that the LCD displays a desired image. However, the LCD tends to have the limitation of poor visibility suffers from image-stickings due to the inherent characteristics of the liquid crystals.

The resolution of the LCD is proportional to the number of unit pixels provided in a unit area. As the number of the unit pixels per unit area increases, the resolution increases. However, as the resolution increases, the number of scanning lines, i.e., gate lines, is increased, and therefore the time to charge external charges, i.e., data signal, into one pixel electrode is decreased. This makes it difficult for the LCD to display a desired image after all.

SUMMARY

In accordance with an exemplary embodiment, a display device includes: a plurality of unit pixels arranged in a matrix form; a plurality of gate lines extending in a row direction and connected to the unit pixels, respectively; pluralities of first and second data lines extending in a column direction and connected to the unit pixels, respectively; a plurality of charge control lines extending in the row direction and connected to the unit pixels, respectively; a plurality of gate connection lines connected to at least two adjacent gate lines, respectively; and a plurality of charge connection lines connected to at least two adjacent charge control lines, respectively.

An insulation layer may be provided over the plurality of gate lines, the plurality of charge control lines and the plurality of gate connection lines. Herein, the plurality of charge connection lines may be disposed on the insulation layer.

The plurality of charge connection lines may be formed of the same material as a pixel electrode in the unit pixel, and may be connected to the charge control lines through contact holes.

An insulation layer may be provided over the plurality of gate lines, the plurality of charge control lines and the plurality of gate connection lines. Herein, the plurality of gate connection lines may be disposed on the insulation layer.

The plurality of gate lines may pass through a unit pixel region.

The first and second data lines may partially overlap a unit pixel region, and a line width of one of the first and second data lines connected to one unit pixel may be smaller than a line width of the other of the first and second data lines not connected to the one unit pixel in one unit pixel region.

The unit pixel may include: a thin film transistor (TFT) connected to one of the first and second data lines and the gate line; and a pixel electrode provided in a region over the TFT, the pixel electrode over the TFT being removed.

The unit pixel includes a thin film transistor including a gate electrode, a gate insulating layer disposed on the gate electrode and an active layer disposed on the gate electrode and under the data lines, and the data line and the active layers have the same planar shape.

The unit pixel may include first and second sub pixels, wherein the gate line may be electrically connected to the first and second sub pixels and the charge control line may be electrically connected to at least one of the first and second sub pixels.

The first and second sub pixels may be charged with different voltages.

Among the plurality of unit pixels arranged in the pixel column direction, odd-numbered unit pixels may be connected to one of the first and second data lines, and even-numbered unit pixels may be connected to another data line to which the odd unit pixels are not connected.

The first sub pixel may include: a first pixel electrode; and a first TFT configured to apply a signal of the first or second data line to the first pixel electrode according to a gate turn-on voltage of the gate line.

The second sub pixel may include: a second pixel electrode; a second TFT configured to apply a signal of the first or second data line to the second pixel electrode according to a gate turn-on voltage of the gate line; a charge control electrode; and a charge control transistor configured to electrically connect the second pixel electrode and the charge control electrode to each other according to a gate turn-on voltage of the charge control line.

The charge connection line may partially overlap at least one gate line or at least one gate connection line, a gate turn-on voltage being applied to the charge connection line after the gate turn-on voltage is applied to the at least one gate line or the at least one gate connection line overlapped with the charge connection line.

The plurality of charge control lines and the plurality of gate lines may be alternately arranged, and the charge connection line may be connected to a gate line disposed next to the at least two connected charge control lines.

The display device may further include a plurality of storage lines extending in the column direction in regions between the pluralities of first and second data lines.

The unit pixel may include a first pixel electrode, a second pixel electrode and a charge control electrode. Herein, the unit pixel further may include: a first storage line passing through the first pixel electrode and extending in the pixel row direction; a second storage line passing through the second pixel electrode and extending in the pixel row direction; and a third storage line passing through the charge control electrode and extending in the pixel row direction.

The first and second pixel electrodes include a plurality of domains having bents.

The unit pixel may include: a plurality of pixel electrodes connected to the gate line; and a charge control electrode connected to the charge control line, the charge control electrode partially overlapping the storage line.

One portion of charge control line extends outward the pixel unit and is connected to the charge connection line.

In accordance with another exemplary embodiment, a display device includes: a plurality of unit pixels arranged in a matrix form; a plurality of gate lines extending in a row direction and connected to the unit pixels, respectively; pluralities of first and second data lines extending in a column direction and connected to the unit pixels, respectively; a plurality of gate connection lines connected to at least two adjacent gate lines, respectively; a storage line overlapping the unit pixel; and a plurality of charge control lines extending in the row direction between two pixel rows.

The plurality of gate lines may pass through unit pixel regions.

The unit pixel may include a pixel electrode, the first and second data lines may partially overlap the pixel electrode, and a line width of one of the first and second data lines connected to one unit pixel may be smaller than a line width of the other of the first and second data lines not connected to the one unit pixel in one unit pixel region.

The unit pixel may include: a TFT connected to one of the first and second data lines and the gate line; and a pixel electrode provided in a region over the TFT, the pixel electrode over the TFT being removed.

The charge control line may be formed of the same material as the gate line and connected to the storage line.

The unit pixels include at least one TFT connected to the gate line and one of the first and second date line.

The unit pixel includes a thin film transistor including a gate electrode, a gate insulating layer disposed on the gate electrode and an active layer disposed on the gate electrode and under the data lines, and the data line and the active layers have the same planar shape.

Odd-numbered pixels may be connected to the first data line, and even-numbered pixels may be connected to the second data line.

The unit pixel may include: a plurality of sub pixels; first TFTs configured to be connected to the plurality of sub pixels; and second TFTs configured to be connected to at least one of the plurality of sub pixels, and to change a charged voltage in the sub pixels connected thereto.

In accordance with yet another exemplary embodiment, a method of driving a display device including a plurality of unit pixels each of which includes a plurality of sub pixels, and a plurality of gate lines connected to the plurality of unit pixels, wherein at least two or more gate lines are connected to each other so that a data signal is applied to the gate lines by applying one gate turn-on signal, the method including: applying one gate turn-on voltage to apply the data signal to the plurality of sub pixels; and applying a next gate turn-on voltage to change the data signal of the sub pixel of at least one of the plurality of sub pixels.

The data signal of at least one of the plurality of sub pixels may increase or decrease when the next gate turn-on voltage is applied.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
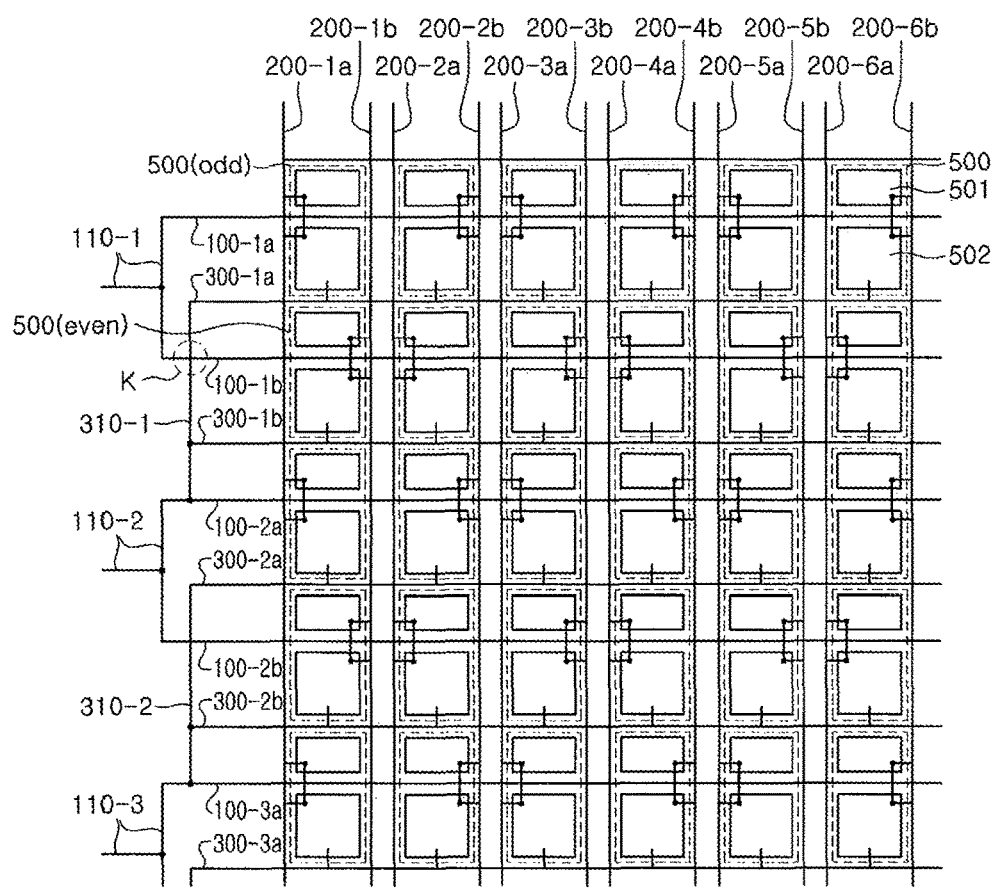
FIG. 1 is a schematic view of a display device in accordance with an exemplary embodiment.
Figure 2:
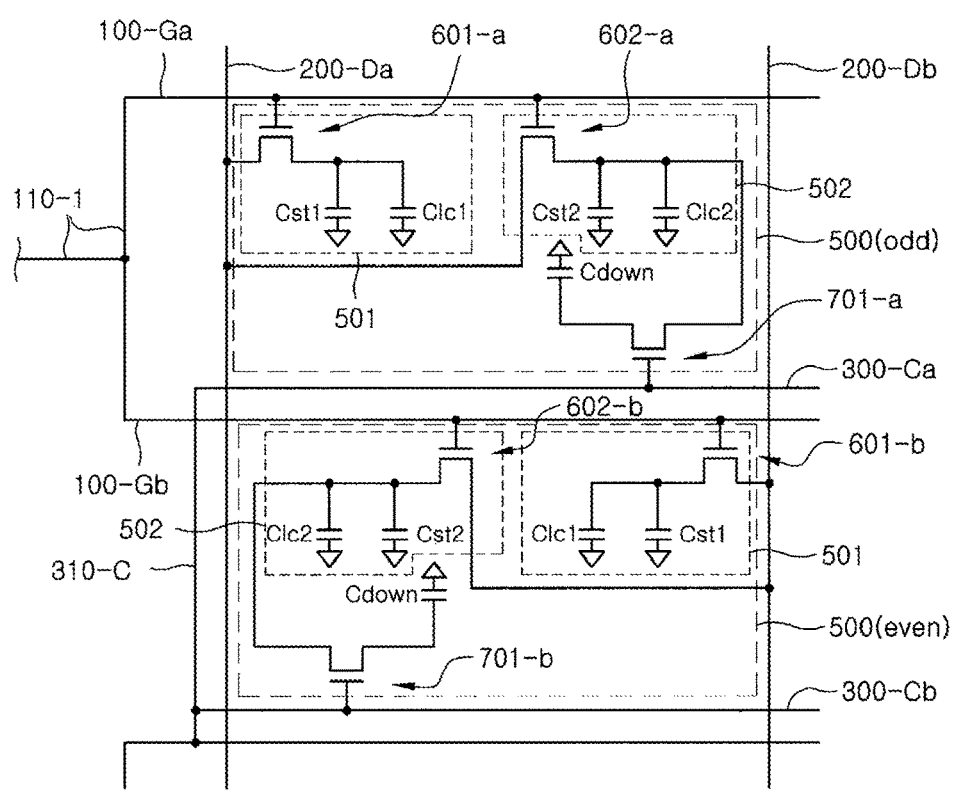
FIG. 2 is a circuit diagram of the display device in accordance with the exemplary embodiment.

FIG. 1 is a schematic view of a display device in accordance with an exemplary embodiment, and FIG. 2 is a circuit diagram of the display device in accordance with the exemplary embodiment.

Referring to FIGS. 1 and 2, the display device in accordance with this exemplary embodiment includes a pixel matrix, a plurality of gate connection lines 110-1, 110-2 and 110-3, a plurality of gate lines 100-1a, 100-2a, 100-3a, 100-1b, 100-2b and 100-3b, a plurality of first data lines 200-1a, 200-2a, 200-3a, 200-4a, 200-5a and 200-6a, a plurality of second data lines 200-1b, 200-2b, 200-3b, 200-4b, 200-5b and 200-6b, a plurality of charge control lines 300-1a, 300-2a, 300-1b and 300-2b, and a plurality of charge connection lines 310-1 and 310-2.

The pixel matrix includes a plurality of unit pixels 500 arranged in a matrix form. The pixel matrix includes a plurality of pixel columns and a plurality of pixel rows. In this exemplary embodiment, the unit pixels 500 emitting red, green and blue light are sequentially arranged in the pixel row direction, but the arrangement direction is not limited thereto. That is, the unit pixels 500 emitting red, green and blue light may be sequentially arranged in the pixel column direction.

As illustrated in FIG. 1, one of the first data lines 200-1a, 200-2a, 200-3a, 200-4a, 200-5a and 200-6a is disposed at the left side of the corresponding pixel column, and one of the second data lines 200-1*b*, 200-2*b*, 200-3*b*, 200-4*b*, 200-5*b* and 200-6*b* is disposed at the right side of the corresponding pixel column. Odd-numbered unit pixels of the pixel column are connected to the first data lines 200-1*a*, 200-2*a*, 200-3*a*, 200-4*a*, 200-5*a* and 200-6*a* or the second data lines 200-1*b*, 200-2*b*, 200-3*b*, 200-4*b*, 200-5*b* and 200-6*b*. Even-numbered unit pixels of the pixel column are connected to the remaining data lines to which the odd-numbered unit pixels are not connected.

The plurality of gate connection lines 110-1, 110-2 and 110-3 connects at least two adjacent gate lines 100-1*a*, 100-2*a* and 100-3*a*, 100-1*b*, 100-2*b* and 100-3*b*. In this exemplary embodiment, a pair of the first and second gate lines 100-1*a* and 100-1*b*, or 100-2*a* and 100-2*b*, is connected to one of the gate connection lines 110-1 and 110-2, as illustrated in FIG. 1. Alternatively, greater number of gate lines more than two may be connected to one of the gate connection lines. In this exemplary embodiment, the two gate lines 100-1*a* and 100-1*b*, 100-2*a* and 100-2*b* or 100-3*a* and 100-3*b* are connected to one gate connection line 110-1, 110-2 or 110-3. In this way, a gate turn-on voltage can be simultaneously applied to the first and second gate lines 100-1*a* and 100-1*b* or 100-2*a* and 100-2*b*.

Referring to FIG. 2, an odd-numbered pixel 500 (odd) which is connected only to the left-hand data line 200-Da and an even-numbered pixel 500 (even) which is connected only to the right-hand data line 200-Db are illustrated. In FIG. 2, the unit pixels 500 each includes a first sub pixel 501 and a second sub pixel 502, but the configuration of the unit pixels 500 is not limited thereto. Alternatively, a number of sub pixels more than two may be provided in the unit pixel 500.

The first sub pixel 501 of an odd-numbered pixel 500 (odd) includes a first thin film transistor (TFT) 601-*a*, a first liquid crystal capacitor Clc1 and a first storage capacitor Cst1. The first TFT 601-*a* is configured such that its gate terminal is connected to the gate line 100-Ga (shown in FIG. 1 as 100-1*a*, 100-2*a* and 100-3*a*).

In an odd-numbered pixel 500 (odd), the first sub-pixel 501 has the first thin film transistor 601-*a* of its source terminal its is connected to the first data line 200-Da (shown in FIG. 1 as 200-1*a*, 200-2*a*, 200-3*a*, 200-4*a*, 200-5*a* and 200-6*a*). The drain terminal of the first thin film transistor 601-*a* is connected to the first liquid crystal capacitor Clc1 and the first storage capacitor Cst1.

The first sub pixel 501 of an even-numbered pixel 500 (even) includes a first thin film transistor (TFT) 601-*b*, a first liquid crystal capacitor Clc1 and a first storage capacitor Cst1. The first TFT 601-*b* is configured such that its gate terminal is connected to the gate line 100-Gb (shown in FIG. 1 as 100-1*b* and 100-2*b*).

The second sub pixel 502 of an odd-numbered pixel 500 (odd) includes a second TFT 602-*a*, a charge control transistor 701-*a*, a second liquid crystal capacitor Clc2, a second storage capacitor Cst2 and a charge down capacitor Cdown. The second TFT 602-*a* is configured such that its gate terminal is connected to the gate line 100-Ga (shown in FIG. 1 as 100-1*a*, 100-2*a* and 100-3*a*.). The source terminal of transistor 602-*a* is connected to the first data line 200-Da (shown in FIG. 1 as 200-1*a*, 200-2*a*, 200-3*a*, 200-4*a*, 200-5*a* or 200-6*a*). The drain terminal of transistor 602-*a* is connected to the second liquid crystal capacitor Clc2 and the second storage capacitor Cst2. The charge control transistor 701-*a* is configured such that a gate terminal is connected to the charge control line 300-Ca (shown in FIG. 1 as 300-1*a* and 300-2*a*). The source terminal of charge control transistor 701-*a* is connected to the second liquid crystal capacitor Clc2; and its drain terminal is connected to the charge down capacitor Cdown.

In an even-numbered pixel 500 (even), the first sub-pixel has the first thin film transistor 601-*b* of its source terminal connected to the second data line 200-Db (shown in FIG. 1 as 200-1*b*, 200-2*b*, 200-3*b*, 200-4*b*, 200-5*b* and 200-6*b*). The drain terminal of this first thin film transistor 601-*b* is connected to its first liquid crystal capacitor Clc1 and the first storage capacitor Cst1. The gate electrode is connected to the gate line 100-Gb (shown in FIG. 1 as 100-1*b*, 100-2*b* and 100-3*b*).

The second sub pixel 502 of an even-numbered pixel 500 (even) includes a second TFT 602-*b*, a charge control transistor 701-*b*, a second liquid crystal capacitor Clc2, a second storage capacitor Cst2 and a charge down capacitor Cdown. The second TFT 602-*b* is configured such that its gate terminal is connected to the gate line 100-Gb (shown in FIG. 1 as 100-1*b* and 100-2*b*). The source terminal of transistor 602-*b* is connected to the second data line 200-Db (shown in FIG. 1 as 200-1*b*, 200-2*b*, 200-3*b*, 200-4*b*, 200-5*b* or 200-6*b*). The drain terminal of transistor 602-*b* is connected to the second liquid crystal capacitor Clc2 and the second storage capacitor Cst2. The charge control transistor 701-*b* is configured such that a gate terminal is connected to the charge control line 300-Cb (shown in FIG. 1 as 300-1*b* and 300-2*b*). The source terminal of charge control transistor 701-*b* is connected to the second liquid crystal capacitor Clc2; and its drain terminal is connected to the charge down capacitor Cdown.

Although not shown, the unit pixel 500 may further include a charge-up capacitor Cup. In this case, the drain terminal of the charge control transistor 701 may be connected to one electrode of the charge-up capacitor Cup. The other electrode of the charge-up capacitor Cup may be connected to the drain terminal of the first TFT 601.

The plurality of gate lines 100-1*a*, 100-2*a* and 100-3*a*, 100-1*b*, 100-2*b* and 100-3*b* extend in a row direction of the pixel matrix. The plurality of gate lines 100-1*a*, 100-2*a*, 100-3*a*, 100-1*b*, 100-2*b* and 100-3*b* are respectively connected to a plurality of pixel rows of the pixel matrix. That is, one of the gate lines 100-1*a*, 100-2*a* and 100-3*a*, 100-1*b*, 100-2*b* and 100-3*b* is connected to one of the pixel rows corresponding thereto. Each of the plurality of gate lines 100-1*a*, 100-2*a* and 100-3*a*, 100-1*b*, 100-2*b* and 100-3*b* is disposed to pass through a unit pixel region, as illustrated in FIG. 1. That is, the plurality of gate lines 100-1*a*, 100-2*a*, 100-3*a*, 100-1*b*, 100-2*b* and 100-3*b* partially overlap the unit pixel region, but the arrangement of the gate lines is not limited thereto. Alternatively, the plurality of gate lines 100-1*a*, 100-2*a* and 100-3*a*, 100-1*b*, 100-2*b* and 100-3*b* may extend along outer periphery of the unit pixel region.

The pluralities of first and second data lines 200-1*a*, 200-2*a*, 200-3*a*, 200-4*a*, 200-5*a*, 200-6*a*, 200-1*b*, 200-2*b*, 200-3*b*, 200-4*b*, 200-5*b* and 200-6*b* extend in a column direction of the pixel matrix. The pluralities of first and second data lines 200-1*a*, 200-2*a*, 200-3*a*, 200-4*a*, 200-5*a*, 200-6*a*, 200-1*b*, 200-2*b*, 200-3*b*, 200-4*b*, 200-5*b* and 200-6*b* are respectively connected to pixel columns of the pixel matrix. Two data lines are connected to one pixel column. That is, one of the first data lines 200-1*a*, 200-2*a*, 200-3*a*, 200-4*a*, 200-5*a* and 200-6*a* is connected to one pixel column, and one of the second data lines 200-1*b*, 200-2*b*, 200-3*b*, 200-4*b*, 200-5*b* and 200-6*b* is also connected to the one pixel column.

As such, even if the number of the gate lines increases to improve resolution, allocated time to each gate line for applying the gate turn-on voltage can be increased. For example, a case in which the resolution increases from 1,920×1,080 to 4,096×2,160 can be described as follows. 1,080 gate lines are required to realize 1,920×1,080 resolution, and 2,160 gate lines are required to realize 4,096×2,160 resolution. Allocated time for displaying one image frame is identical in both cases. Both cases will be described based on an assumption that a time allocated for displaying one image frame is, for example, one second. In the case of the display device having 1,080 gate lines, the gate turn-on voltage is applied for one second to all the gate lines, i.e., 1,080 gate lines, and accordingly the time allocated to one gate line for applying the gate turn-on voltage is $\frac{1}{1,080}$ second. In the case of the display device having 2,160 gate lines, however, the gate turn-on voltage is applied for one second to all of the 2,160 gate lines, and accordingly the time allocated to one gate line for applying the gate turn-on voltage is decreased to $\frac{1}{2,160}$ second. That is, if the resolution increases twice as much, the time allocated for applying the gate turn-on voltage to one gate line is reduced by half.

However, in this exemplary embodiment, the two gate lines 100-1a and 100-1b or 100-2a and 100-2b are connected to one gate connection line 110-1 or 110-2, and accordingly the number of the gate connection lines 110-1 and 110-2 is 1,080. Therefore, the gate turn-on voltage may be applied to only 1,080 gate connection lines so as to display one image frame. That is, in this exemplary embodiment, the gate turn-on voltage is simultaneously applied to the two gate lines 100-1a and 100-1b or 100-2a and 100-2b, and the time allocated to one gate line 100-1a, 100-2a, 100-1b or 100-2b for applying the gate turn-on voltage is not reduced.

Since the gate turn-on voltage is simultaneously applied to the two gate lines 100-1a and 100-1b or 100-2a and 100-2b which are adjacent to each other, two pixel rows respectively connected to the two gate lines 100-1a and 100-1b or 100-2a and 100-2b operate at the same time. That is, the first and second TFTs 601 and 602 in two unit pixels vertically adjacent to each other are simultaneously turned on. If the first and second TFTs 601 and 602 in the two unit pixels vertically adjacent to each other are connected to the same data line, the resolution cannot be increased because the vertically adjacent two unit pixels display the same image. Accordingly, in this exemplary embodiment, the first and second TFTs 601 and 602 disposed in the upper unit pixel are connected to the first data line 200-1a, 200-2a, 200-3a, 200-4a, 200-5a and 200-6a, and the first and second TFTs 601 and 602 disposed in the lower unit pixel are connected to the second data line 200-1b, 200-2b, 200-3b, 200-4b, 200-5b and 200-6b. Different data signals, i.e., charges, are respectively applied to the first and second data lines 200-1a, 200-2a, 200-3a, 200-4a, 200-5a, 200-6a, 200-1b, 200-2b, 200-3b, 200-4b, 200-5b and 200-6b. Consequently, the vertically adjacent two unit pixels 500 can display different images, respectively.

The display device of this exemplary embodiment includes the charge control lines 300-1a, 300-2a, 300-1b and 300-2b for controlling the amount of charges in the first and second sub pixels 501 and 502 of the unit pixel 500. The plurality of charge control lines 300-1a, 300-2a, 300-1b and 300-2b extend in the row direction of the pixel matrix, and are connected to the plurality of pixel rows. The plurality of charge control lines 300-1a, 300-2a, 300-1b and 300-2b are electrically insulated from the plurality of gate lines 100-1a, 100-2a, 100-3a, 100-1b, 100-2b and 100-3b.

That is, each charge control line 300-1a, 300-2a, 300-1b and 300-2b is electrically insulated from the gate line 100-1a, 100-2a, 100-3a, 100-1b, 100-2b and 100-3b connected to the pixel row to which the charge control line itself 300-1a, 300-2a, 300-1b and 300-2b is connected, but it is electrically connected to the gate line 100-1a, 100-2a, 100-3a, 100-1b, 100-2b and 100-3b connected to the next pixel row. In this way, the visibility of the display device can be improved. The gate turn-on voltage is applied to the gate line 100-1a, 100-2a, 100-3a, 100-1b, 100-2b or 100-3b to accumulate charges in the first and second sub pixels 501 and 502. Subsequently, when a gate turn-on voltage is applied to the gate line 100-1a, 100-2a, 100-3a, 100-1b, 100-2b or 100-3b in a next pixel row, the gate turn-on voltage is also applied to the plurality of charge control lines 300-1a, 300-2a, 300-1b and 300-2b, and thereby the amount of charges in at least one of the first and second sub pixels 501 and 502 is changed. In this exemplary embodiment, the amount of charges in the second sub pixel is reduced to improve the visibility.

In the aforementioned description, the charge control line 300-1a, 300-2a, 300-1b or 300-2b is connected to the gate line in the next pixel row so that the charge control line 300-1a, 300-2a, 300-1b or 300-2b simultaneously receives the gate turn-on voltage. That is, in this exemplary embodiment, the gate turn-on voltage is applied to the two gate lines 100-1a and 100-1b, 100-2a and 100-2b or 100-3a and 100-3b and also to the charge control lines 300-1a, 300-2a, 300-1b and 300-2b through a plurality of stage units connected to the plurality of gate connection lines 110-1, 110-2 and 110-3, respectively. However, the present invention is not limited thereto. That is, the charge control lines 300-1a, 300-2a, 300-1b and 300-2b may be separated from the gate lines 100-1a, 100-2a, 100-3a, 100-1b, 100-2b and 100-3b of the next pixel row and may receive a gate turn-on voltage through a separate gate turn-on voltage supply unit to change the amount of charges of the sub pixel. That is, it is possible to apply the gate turn-on voltage to the charge control lines 300-1a, 300-2a, 300-1b and 300-2b using a separate stage unit.

In this exemplary embodiment, the two gate lines 100-1a and 100-1b or 100-2a and 100-2b are connected to each other through one gate connection line 110-1 or 110-2. Likewise, in the plurality of charge control lines 300-1a, 300-2a, 300-1b and 300-2b, the two charge control lines 300-1a and 300-1b or 300-2a and 300-2b are connected to each other through one charge connection line 310-1 or 310-2. The charge connection lines 310-1 and 310-2 are connected to the gate connection line 110-2 and 110-3 of the next pixel row. In this case, the gate connection line 110-1 partially overlaps the charge connection line 310-1 in a predetermined region, which is denoted as "K" in FIG. 1. Hence, one of the gate connection line 110-1, 110-2 and 110-3 and the charge connection line 310-1 and 310-2 may be formed in a bridge shape. That is, the charge control lines 310-1 and 310-2 are each connected to the next gate lines 110-2 and 110-3 respectively, which may cause short-circuiting if they are all fabricated with the gate lines. For this reason, the charge connection lines 310-1 and 310-2 are not fabricated together with the gate line but fabricated in the shape of the bridge line in this exemplary embodiment.

Hereinafter, the display device in accordance with this exemplary embodiment will be described in detail with reference to the accompanying drawings.

Figure 3:
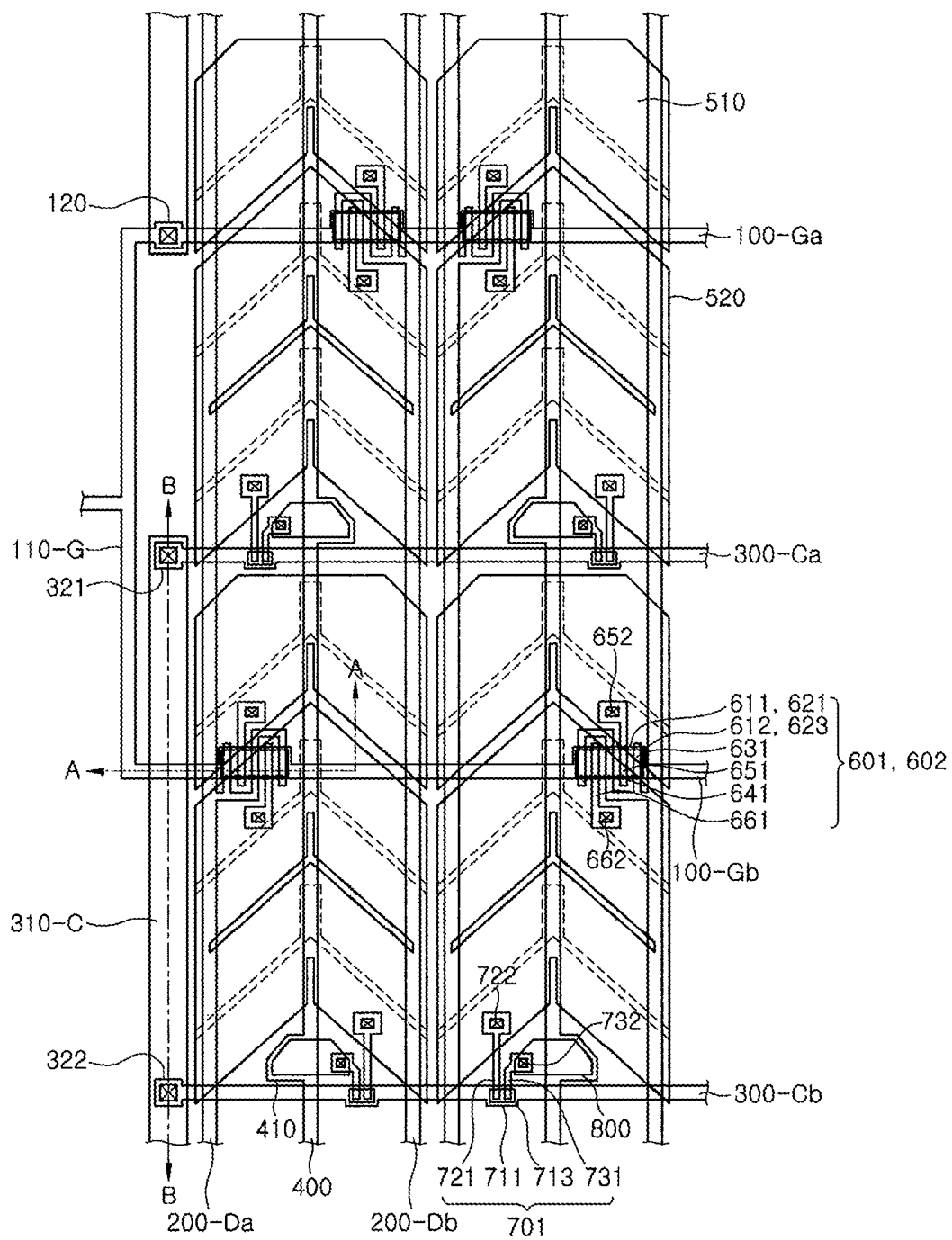
FIG. 3 is a plan view of the display device in accordance with the exemplary embodiment.
Figure 4:
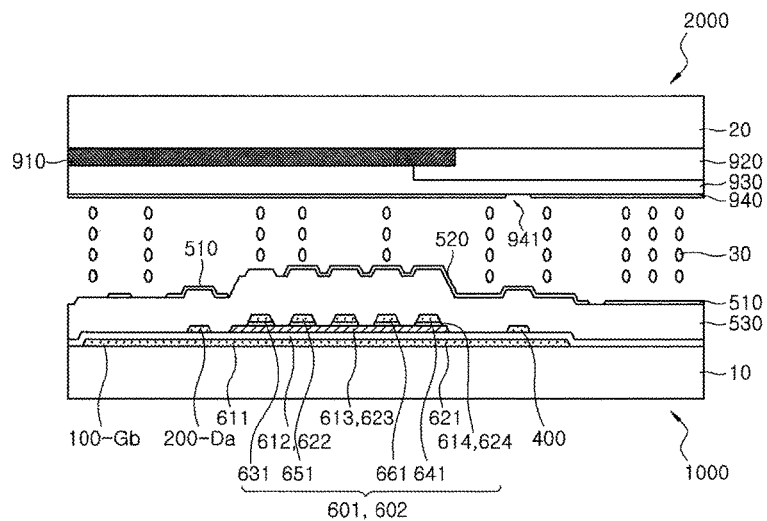
FIG. 4 is a cross-sectional view taken along line A-A of FIG. 3.

FIG. 3 is a plan view of the display device in accordance with the exemplary embodiment. FIG. 4 is a cross-sectional view taken along line A-A of FIG. 3, and FIG. 5 is a cross-sectional view taken along line B-B of FIG. 3.

Figure 5:
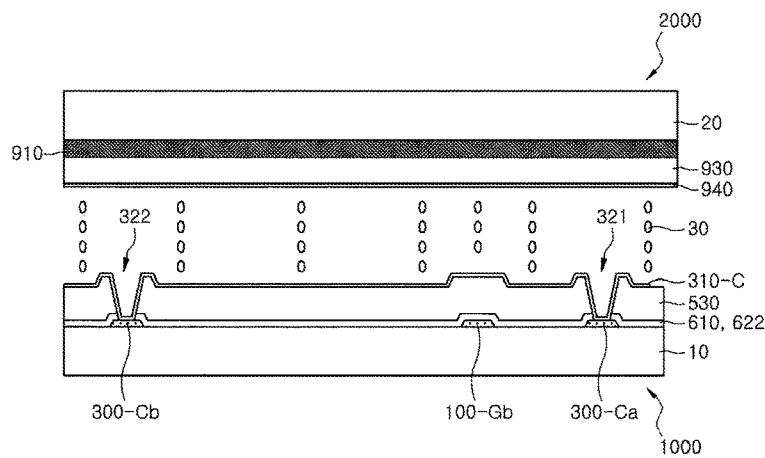
FIG. 5 is a cross-sectional view taken along line B-B of FIG. 3.

Referring to FIGS. 3 through 5, the display device includes a TFT substrate 1000 as a lower substrate, a common electrode substrate 2000 facing the TFT substrate 1000 as an upper substrate and, and liquid crystals 30 disposed between TFT substrate 1000 and the common electrode substrate 2000.

An alignment layer (not shown) may be disposed on surfaces of the upper and lower substrates to align liquid crystals molecules. The alignment mode of the liquid crystals 30 may be a vertical alignment mode where the liquid crystals 30 are vertically aligned with respect to the upper and lower substrates, but the alignment mode is not limited thereto.

The TFT substrate 1000 includes a transparent insulation substrate 10. The transparent insulation substrate 10 may include, for example, a glass or a transparent plastic.

The TFT substrate 1000 includes the plurality of gate lines 100-Ga and 100-Gb extending in the row direction on the insulation substrate 10. Portions of the plurality of gate lines 100-Ga and 100-Gb protrude upwardly and/or downwardly to form first and second gate terminals of the first and second TFTs 601 and 602. The gate line 100-Ga and 100-Gb may have a monolayer structure or a multilayered structure with two or more layers. In a case where the gate line 100-Ga and 100-Gb has a multilayered structure with two or more layers, one layer may be formed of a low-resistance material and other layers may be formed of a material having good contact characteristic with other materials. For example, the gate line 100-Ga and 100-Gb may be formed of a bi-layer of Cr/Al (or Al alloy) or a bi-layer of Al (or Al alloy)/Mo. Alternatively, the gate line 100-Ga and 100-Gb may be formed of various kinds of metal or conductive materials.

As illustrated in FIG. 3, two adjacent gate lines 100-Ga and 100-Gb of the plurality of gate lines 100-Ga and 100-Gb are connected to each other by a gate connection line 110-G of the plurality of gate connection lines. The gate connection line 110-G may be formed of the same material as the gate line 100-Ga and 100-Gb on the same plane. A charge pad 120 to be connected to a charge connection line 310-C is disposed in a region where the gate connection line 110-G and the first gate line 100-Ga are connected to each other. A gate contact pad (not shown) for connection with an external circuit may be provided at the end of the gate connection line 110-G.

The TFT substrate 1000 includes a plurality of charge control lines 300-Ca and 300-Cb extending in the same direction as the plurality of gate lines 100-Ga and 100-Gb. The charge control lines 300-Ca and 300-Cb partially protrude upwardly and/or downwardly to form a gate terminal 711 of the charge control transistor 701. The charge control lines 300-Ca and 300-Cb are formed of the same material as the gate lines 100-Ga and 100-Gb on the same plane. As illustrated in FIG. 3, the two adjacent charge control lines 300-Ca and 300-Cb are connected to a charge connection line 310-C. An insulating passivation layer is disposed between the charge connection line 310-C and the two charge control lines 300-Ca and 300-Cb. Therefore, the charge connection line 310-C and the two charge control lines 300-Ca and 300-Cb are connected through first and second charge contact holes 321 and 322. The charge connection line 310-C is connected to the charge pad 120.

Here, the TFT substrate 1000 is divided into an image display region in which the plurality of unit pixels are provided and a peripheral region. The charge connection line 310-C may be disposed in the peripheral region. As a result, a sufficient process margin to form the charge connection line 310-C can be ensured, and short-circuiting between the image display region and the pixel electrode can be prevented. Of course, the above-described gate lines 100-Ga and 100-Gb are provided in the image display region. Alternatively, portions of the gate lines 100-Ga and 100-Gb may extend to the peripheral region. The gate connection line 110-G may be provided in the peripheral region. Alternatively, a portion of the gate connection line 110-G may extend to the image display region.

The TFT substrate 1000 includes the pluralities of first and second data lines 200-Da and 200-Db intersecting the plurality of gate lines 100-Ga and 100-Gb. The first and second data lines 200-Da and 200-Db are disposed adjacent to the left and right sides of the pixel column. The first and second data lines 200-Ga and 200-Gb partially protrude to form first and second source terminals 631 and 641 of the first and second TFTs 601 and 602. The first and second data lines 200-Da and 200-Db may have a monolayer structure or a multilayered structure having two or more layers with different physical properties. In a case where the first and second data lines 200-Da and 200-Db are formed to have a multilayered structure with two or more layers, one layer may be formed of a low-resistance material so as to reduce a delay of a data signal or a voltage drop, and other layers may be formed of a material having good contact characteristic with other materials. Although the first and second data lines 200-Da and 200-Db are illustrated to have a liner shape, it is not limited thereto. That is, the first and second data lines 200-Da and 200-Db may have a shape of a bended straight line or a curved line.

The TFT substrate 1000 includes a plurality of storage lines 400 extending to a region between the first and second data lines 200-Da and 200-Db. That is, the plurality of storage lines 400 extend parallel to the first and second data lines 200-Da and 200-Db. The storage line 400 may be formed of the same material as the first and second data lines 200-Da and 200-Db on the same plane. The storage line 400 is used as electrode terminals of the first and second storage capacitors Cst1 and Cst2. As illustrated in FIG. 3, the storage line 400 partially protrudes to form a protrusion 410. Here, the protrusion 410 is used as one electrode terminal of the charge down capacitor Cdown. The storage line 400 may be disposed to pass through a central region of the unit pixel in the column direction. The first and second TFTs 601 and 602 in the plurality of unit pixels arranged in the column direction are alternately arranged at the left side and the right side of the storage line 400. In consideration of two unit pixels in the same pixel column as illustrated in FIG. 3, the first and second TFTs 601 and 602 in the upper unit pixel are disposed at the right side of the storage line 400 but the first and second TFTs 601 and 602 in the lower unit pixel are disposed at the left side of the storage line 400. This is because the first and second data lines 200-Da and 200-Db are positioned at the left side and the right side of the pixel column; one of the two unit pixels is connected to the first data line 200-Da at the left side thereof; and the other of the two unit pixels is connected to the second data line 200-Db at the right side thereof.

The TFT substrate 1000 includes the first and second pixel electrodes 510 and 520. The first electrode 510 is used as one electrode terminal of the first liquid crystal capacitor Clc1 and the first storage capacitor Cst1, and the second pixel electrodes 520 is used as one electrode terminal of the second liquid crystal capacitor Clc2 and the second storage capacitor Cst2. The first and second pixel electrodes 510 and 520 are formed of a transparent conductive material such as indium tin oxide (ITO), indium zinc oxide (IZO) and the like. The first and second pixel electrodes 510 and 520 are provided in the unit pixel region. The first and second pixel electrodes 510 and 520 are spaced apart from each other by a cut-out portion. The cut-out portion may have the shape of a reversed V as illustrated in FIG. 3. The first pixel electrode 510 is disposed at an upper side of the unit pixel region, and the second pixel electrode 520 is disposed at a lower side of the unit pixel region. The first and second pixel electrodes 510 and 520 include a plurality of domains. Cut-out patterns or protrusions are used to divide domains. The first and second pixel electrodes 510 and 520 may be mirror-symmetrically arranged with respect to the storage line 400. An insulation layer is provided between the first and second pixel electrodes 510 and 520 and underlying structures, e.g., the first and second TFTs 601 and 602, the gate lines 100-Ga and 100-Gb, the first and second data lines 200-Da and 200-Db, and the storage line 400. An organic layer and/or an inorganic layer may be used as the insulation layer. In this exemplary embodiment, an organic passivation layer 530 is used as the insulation layer. Alternatively, a silicon nitride layer may be further provided under the organic passivation layer 530.

In this exemplary embodiment, the gate lines 100-Ga and 100-Gb are disposed to get across a region between the first and second pixel electrodes 510 and 520, i.e., the cut-out region, in the row direction as illustrated in FIG. 3. As the gate lines 100-Ga and 100-Gb are disposed inside the unit pixel region, an overlapping area between the gate lines 100-Ga and 100-Gb and the first and second pixel electrodes 510 and 520 becomes uniform. Through this configuration, it is possible to solve a problem caused by parasitic capacitance occurring in the overlapping area.

The TFT substrate 1000 includes the first and second TFTs 601 and 602 connected to one of the first and second data lines 200-Da and 200-Db and one of the gate lines 100-Ga and 100-Gb.

The first TFT 601 includes a first gate terminal 611, a first source terminals 631 and a first drain terminal 651. Likewise, the second TFT 602 includes a second gate terminal 621, a second source terminals 641 and a second drain terminal 661. The first TFT 601 further includes a gate insulating layer 612 on the first gate terminals 611, an active layer 613 on the gate insulating layer 612 and an ohmic contact layer 614. The second TFT 602 also further includes a gate insulating layer 622 on the second gate terminals 621, an active layer 623 on the gate insulating layer 622 and an ohmic contact layer 624. As illustrated in FIGS. 3 and 4, the first and second gate terminals 611 and 621 are formed as a single body. The gate insulating layers 612 and 622 may include a silicon nitride layer or a silicon oxide layer. The active layers 613 and 623 are disposed on the first and second gate terminals 611 and 621. The first and second source terminals 631 and 641 are formed in the shape of a bended straight line on the active layers 613 and 623. That is, as illustrated in FIG. 3, the first and second source terminals 631 and 641 include first to third extension straight lines, a first connection line and a second connection line. The first connection line is disposed at a lower side of the gate line 100-Ga and 100-Gb and connects the first and second extension straight lines. The second connection line is disposed at an upper side of the gate line 100-Ga and 100-Gb and connects the second and third extension straight lines. The first connection line is connected to the first data line 200-Da or the second data line 200-Db. The first and second drain terminals 651 and 661 respectively extend from lower regions of the first and second pixel electrodes 510 and 520 to an upper region of the active layers 613 and 623. The first drain terminal 651 extends to a space between the first and second extension straight lines, and the second drain terminal 661 extends to a space between the second and third extension straight lines. The first drain terminal 651 is connected to the first pixel electrode 510 through a first pixel contact hole 652. The second drain terminal 661 is connected to the second pixel electrode 520 through a second pixel contact hole 662.

Although not shown, the active layers 613 and 623 are positioned not only over the first and second gate terminals 611 and 621, but may be positioned also in the lower regions of the first and second drain terminals 651 and 661. The active layers 613 and 623 may be positioned also in the lower regions of the first and second data lines 200-Da and 200-Db. That is, the active layers 613 and 623 are disposed under the first and second data lines 200-Da and 200-Db, and the first and second data lines 200-Da and 200-Db and the active layers 613 and 623 have the same planar shape.

The TFT substrate 1000 includes the charge control transistor 701 connected to the charge connection line 310-C. The charge control transistor 701 includes: a gate terminal 711 connected to the charge connection line 310-C and the charge control lines 300-Ca and 300-Cb; a gate insulating layer 712 disposed on the gate terminal 711; an active layer 713 disposed on the gate insulating layer 712 over the gate terminal 712; and source and drain terminals 721 and 731 disposed on the active layer 713. The source terminal 721 is connected to the second pixel electrode 520 through a source contact hole 722. The drain terminal 731 is connected to the charge control electrode 800 through a drain contact hole 732. The charge control electrode 800 is used as one electrode terminal of the charge down capacitor Cdown. That is, a portion of the charge control electrode 800 overlaps the protrusion 410 of the storage line 400. When the charge control transistor 701 is turned on, some charges accumulated in the second pixel electrode 520 moves into the charge control electrode 800 by the charge control transistor 701. The charge control electrode 800 is simultaneously formed with the first and second pixel electrodes 510 and 520. The charge control electrode 800 is positioned in the cut-out region at the lower side of the second pixel electrode 520, and the charge control transistor 701 is positioned in a region adjacent to the cut-out region of the second pixel electrode 520, whereby a length of an interconnection required for contact connection can be minimized and thus reduction of an aperture ratio can be suppressed.

Thereafter, the common electrode substrate 2000 includes a light transmitting insulating substrate 20; a light shielding pattern 910; red, green and blue color filters 920; an overcoat layer 930 disposed on the light shielding pattern 910 and the color filters 920, and a common electrode 940 disposed on the overcoat layer 930. Here, the light shielding pattern 910 prevents light leakage and light interference between the adjacent unit pixel regions. A black matrix is used as the light shielding pattern 910. The overcoat layer 930 is formed of an organic material. The common electrode 940 is formed of a transparent conductive material such as ITO, IZO or the like. A plurality of cut-out patterns 941 are provided in the common electrode 940 for controlling the domains, but the controlling of the domains is not limited thereto. That is, other members or ways, for example, protrusions, may be employed to control the domains.

The common electrode 940 is used as one electrode terminal of each of the first and second liquid crystal capacitors Clc1 and Clc2. That is, in the first liquid crystal capacitor Clc1, the first pixel electrode 510 is used as an upper electrode, the common electrode 940 is used as a lower electrode, and the liquid crystals 30 is used as a dielectric. Similarly, in the second liquid crystal capacitor Clc2, the second pixel electrode 520 is used as an upper electrode, the common electrode 940 is used as a lower electrode, and the liquid crystals 30 is used as a dielectric.

The TFT substrate 1000 and the common electrode substrate 2000 are attached to each other with the liquid crystals 30 interposed therebetween to manufacture a base panel of the display device in accordance with the exemplary embodiment. Although not shown, the display device may further include a polarization film, a backlight and an optical plate/sheet, etc., at both sides of the base panel.

In this exemplary embodiment, the two gate lines 100-Ga and 100-Gb are connected to each other through one gate connection line 110-G, and the gate turn-on voltage is applied to the gate connection line 100-Ga. In this way, reduction of a charging time, i.e., a gate turn-on time of a TFT, can be prevented even when the resolution is increased. In addition, a unit pixel can be manufactured to include first and second sub pixels, and a charge controller which is driven according to a next gate turn-on voltage and thus controls the amount of charges of the second sub pixels. Herein, the first sub pixel is a main pixel representing high gradation, and the second sub pixel is a sub pixel representing low gradation. Consequently, it is possible to improve the visibility of the display device.

Hereinafter, a method of fabricating the display device having the above configuration will be described in detail, particularly focusing on a TFT substrate.

Figure 6:
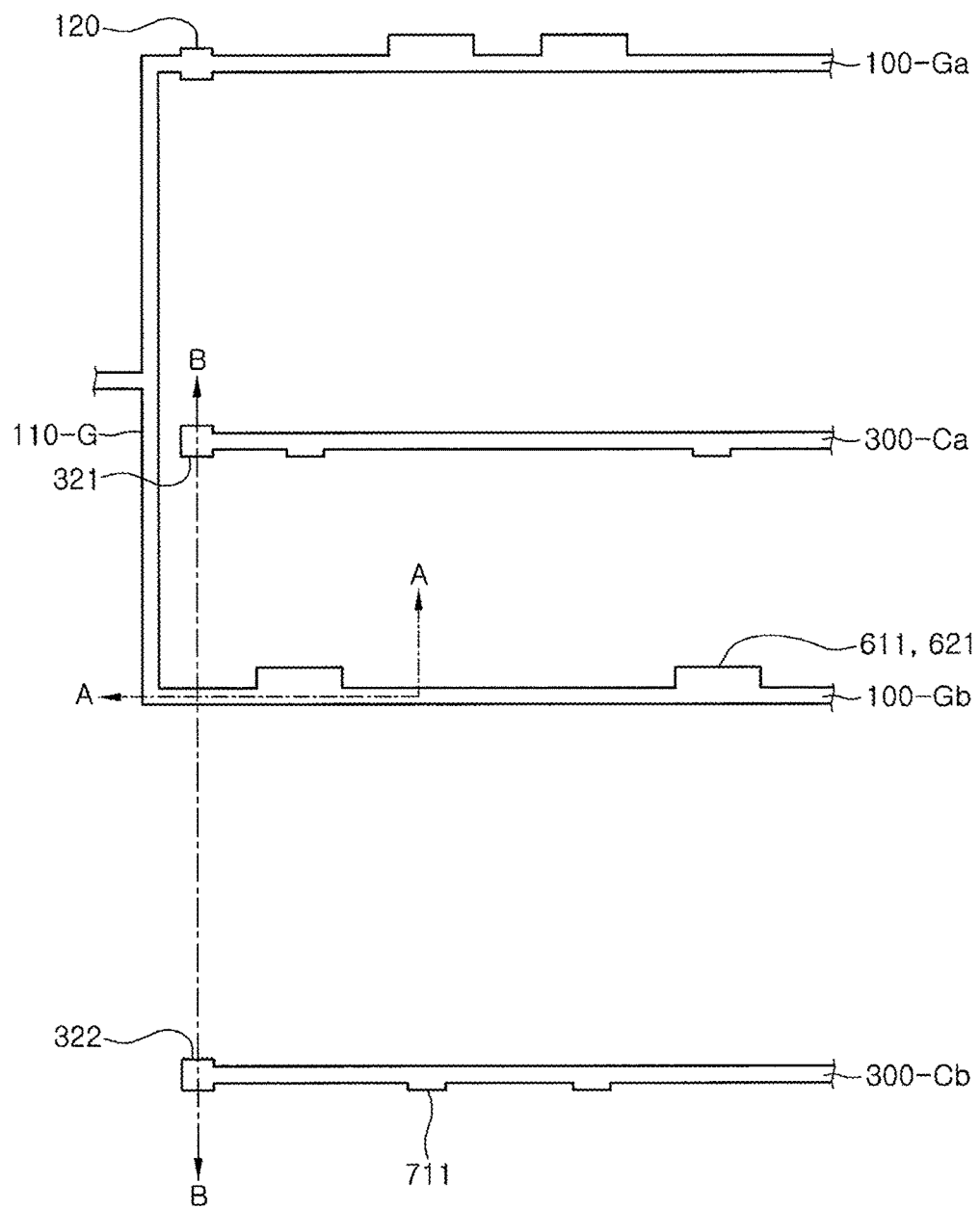
FIGS. 6, 7 and 8 are schematic views illustrating a method of fabricating a thin film transistor (TFT) substrate in accordance with the exemplary embodiment.
Figure 7:
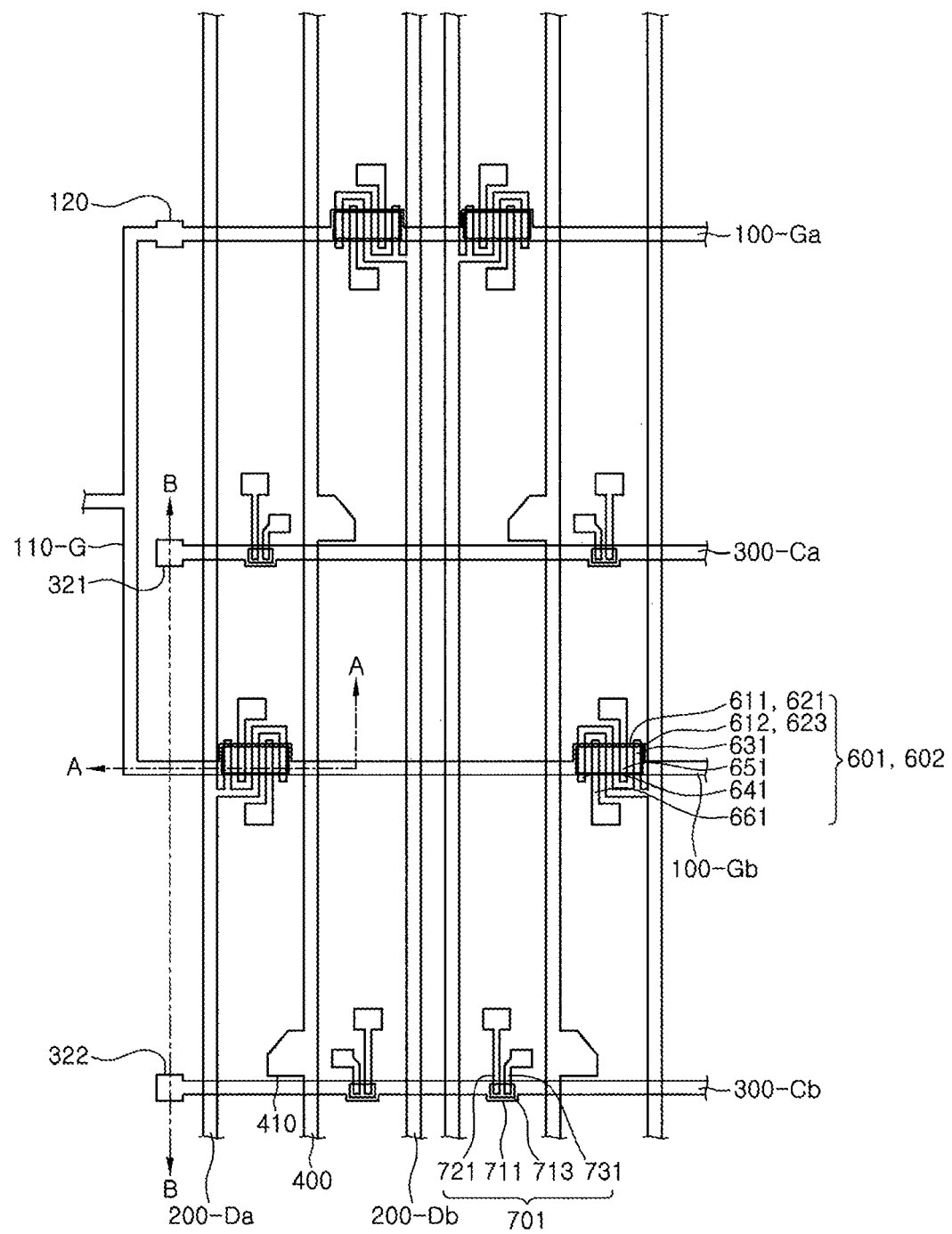
Figure 8:
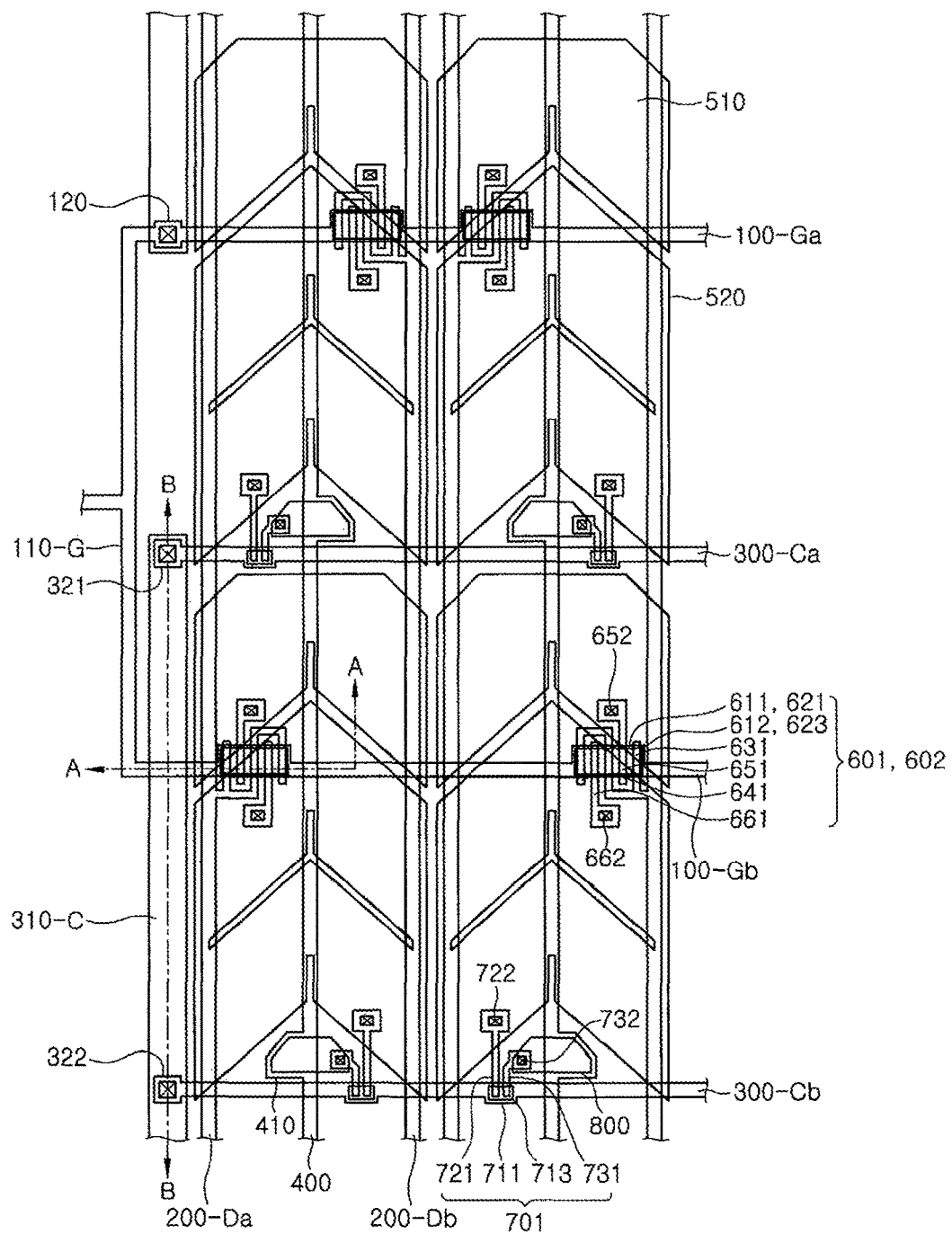
Figure 9:
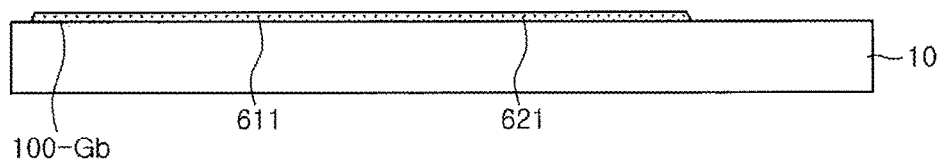
FIG. 9 is a cross-sectional view taken along line A-A of FIG. 6.
Figure 10:
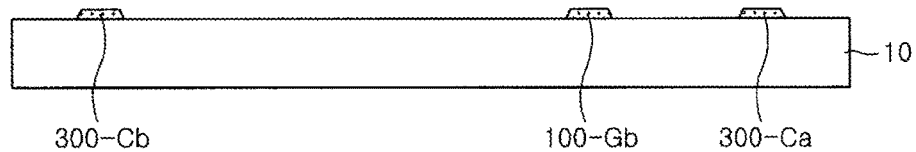
FIG. 10 is a cross-sectional view taken along line B-B of FIG. 6.
Figure 11:
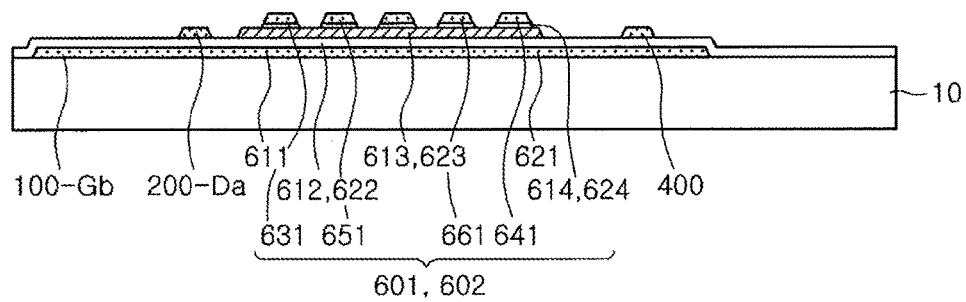
FIG. 11 is a cross-sectional view taken along line A-A of FIG. 7.
Figure 12:
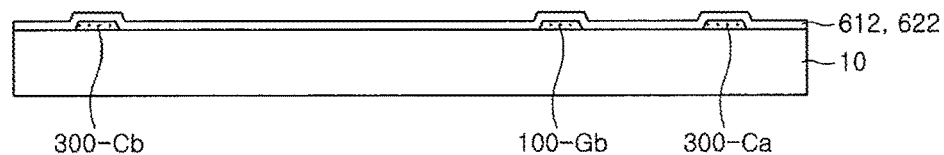
FIG. 12 is a cross-sectional view taken along line B-B of FIG. 7.
Figure 13:
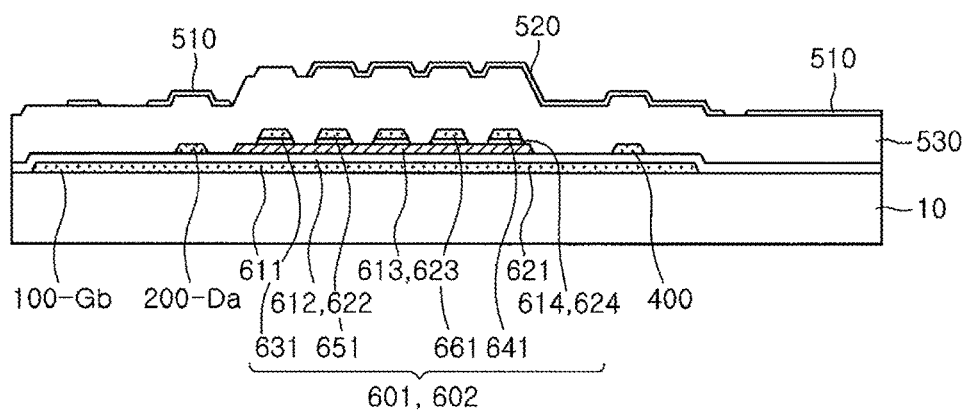
FIG. 13 is a cross-sectional view taken along line A-A of FIG. 8.
Figure 14:
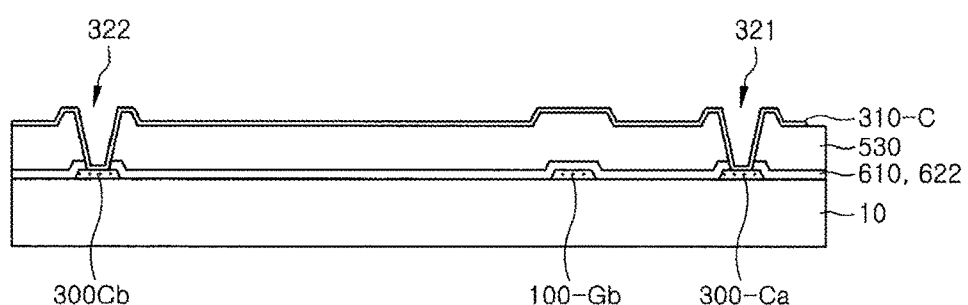
FIG. 14 is a cross-sectional view taken along line B-B of FIG. 8.

FIGS. 6 through 8 are schematic views illustrating a method of fabricating the TFT substrate in accordance with the exemplary embodiment. FIG. 9 is a cross-sectional view taken along line A-A of FIG. 6, and FIG. 10 is a cross-sectional view taken along line B-B of FIG. 6. FIG. 11 is a cross-sectional view taken along line A-A of FIG. 7, and FIG. 12 is a cross-sectional view taken along line B-B of FIG. 7. FIG. 13 is a cross-sectional view taken along line A-A of FIG. 8, and FIG. 14 is a cross-sectional view taken along line B-B of FIG. 8.

Referring to FIGS. 6, 9 and 10, a first conductive layer is formed on a substrate 10. The first conductive layer is patterned to form a plurality of gate lines 100-Ga and 100-Gb, a plurality of gate connection lines 110-G and charge control lines 300-Ca and 300-Cb. At this time, gate terminals 611 and 621 of first and second TFTs and a gate terminal 711 of a charge control transistor are formed simultaneously.

The first conductive layer may include one of Cr, MoW, Cr/Al, Cu, Al (Nd), Mo/Al, Mo/Al (Nd), Cr/Al (Nd), Mo/Al/Mo and combinations thereof. But the first conductive layer is not limited thereto. That is, as aforementioned, the first conductive layer may include one of Al, Nd, Ag, Cr, Ti, Ta, Mo and combinations thereof, or an alloy including at least one of the foregoing elements. Further, the first conductive layer may be formed of a monolayer or a multilayered structure. Specifically, the first conductive layer may be a bi-layer or a tri-layer including a metal layer having good physical and chemical properties, for example, Cr, Ti, Ta and Mo, and a metal layer having low specific resistivity, for example, Al-based metal or Ag-based metal. After forming the first conductive layer on an entire surface of the substrate, a photoresist layer is formed and thereafter a lithography process is performed using a mask to form a photoresist mask pattern. An etch process is performed using the photoresist mask pattern as an etch mask. As such, the first and second gate lines 100-Ga and 100-Gb are formed, and the gate connection line 110-G connecting the first and second gate lines 100-Ga and 100-Gb to each other is formed, as illustrated in FIGS. 6, 9 and 10. A plurality of gate terminals 611 and 621 are formed on the first and second gate lines 100-Ga and 100-Gb. The first and second charge control lines 300-Ca and 300-Cb are formed, and the gate terminal 711 is formed on the first and second charge control lines 300-Ca and 300-Cb.

Referring to FIGS. 7, 11 and 12, gate insulating layers 612 and 622, a thin film for active layer and a thin film for ohmic contact layer are sequentially formed on the substrate 10 where the gate lines 100-Ga and 100-Gb are formed. Afterwards, the thin film for active layer and the thin film for ohmic contact layer are patterned to form active layers 613, 623 and 713, and ohmic contact layers 614 and 624.

The gate insulating layer 612 and 622 may be formed of an inorganic insulating material including silicon oxide or silicon nitride. An amorphous silicon layer is used as the thin film for active layer. A silicide or an amorphous silicon layer heavily doped with n-type impurities is used as the thin film for ohmic contact layer.

Subsequently, a second conductive layer is formed over a resultant structure and then patterned to form first and second data lines 200-Da and 200-Db, source terminals 631, 641 and 721, drain terminals 651, 661 and 731 and a storage line 400. The second conductive layer may be a single layer or a multi-layer, which may be formed of one of Mo, Al, Cr, Ti and combinations thereof. Of course, the second conductive layer may be formed of the same material used for the first conductive layer. In this way, first and second TFTs 601 and 602 are fabricated, each of which includes the gate terminal 611 and 621, the source terminal 631 and 641 and the drain terminal 651 and 661. Further, the charge control transistor 701 including the gate terminal 711, the source terminal 721 and the drain terminal 731 is fabricated.

Referring to FIGS. 8, 13 and 14, a passivation layer 530 is formed over the substrate 10 where the first and second TFTs 601 and 602 and the charge control transistor 701 are formed. The passivation layer 530 is partially removed through an etch process using a photoresist mask pattern to thereby form first and second pixel contact holes 652 and 662 that expose portions of the drain terminals 651 and 661 of the first and second TFTs 601 and 602. A source contact hole 722 is formed to expose a portion of the source terminal 721 of the charge control transistor 701, and a drain contact hole 732 is formed to expose a portion of the drain terminal 731 of the charge control transistor 701. Charge contact hole 321 and 322 is formed to expose one end portion of the charge control line 300-Ca and 300-Cb. A contact hole exposing a portion of a charge pad 120 is formed.

A third conductive layer is formed on the passivation layer 530 where the contact holes are formed. The third conductive layer is patterned using a photoresist mask pattern (not shown) to form first and second pixel electrodes 510 and 520 having cut-out patterns, a charge control electrode 800 is formed, and the charge connection line 310-C is formed.

The third conducive layer may employ a transparent conductive layer including ITO or IZO. The first pixel electrode 510 is connected to the drain terminal 651 of the first TFT 601 through the first pixel contact hole 652. The second pixel electrode 520 is connected to the drain terminal 661 of the second TFT 602 through the second pixel contact hole 662, and is connected to the source terminal 721 of the charge control transistor 700 through the source contact hole 722. The charge control electrode 800 is connected to the drain terminal 731 of the charge control transistor 700 through the drain contact hole 732.

The first charge contact hole 321 of the charge control line 300-Ca formed between the two gate lines 100-Ga and 100-Gb which are connected to each other by the gate connection line 110-G is connected to the second charge contact hole 322 of the charge control line 300-Cb disposed at a lower side of the charge control line 300-Ca through the charge connection line 310-C. The charge connection line 310-C is connected to the gate connection line and/or the charge pad of the gate line in a next pixel row.

Such a structure where the charge connection line 310-C formed from the third conductive layer is connected to the charge control lines 300-Ca and 300-Cb at the lower side of the charge connection line 310-C through the first and second charge contact holes 321 and 322, is referred to as a bridge line.

Through the above-described procedure, a unit pixel that has first and second sub pixels and is capable of adjusting the amount of charges in the first and second sub pixels can be fabricated. Further, upper and lower unit pixels, which are vertically adjacent to each other, can be simultaneously driven.

After forming the first and second pixel electrodes 510 and 520, a first alignment layer (not shown) is formed on a resultant structure, thereby completing a lower substrate, i.e., TFT substrate.

Although not shown, a common electrode substrate is prepared by sequentially forming a back matrix, color filters, an overcoat layer, protrusive patterns, a transparent common electrode and a second alignment layer (not shown) over a transparent insulation substrate. Thereafter, the TFT substrate and the common electrode substrate are attached to each other with a spacer (not shown) interposed therebetween. Subsequently, a liquid crystal layer is formed by injecting liquid crystal material into a space formed by the spacer between the TFT substrate and the common electrode substrate, thus completing the LCD in accordance with the exemplary embodiment.

Although the TFT substrate of the exemplary embodiment is formed through five sheet masks, the masking process is not limited thereto. That is, the TFT substrate may be formed through five or more sheet masks or five or less sheet masks.

The present invention is not limited to the aforesaid description, but the storage line may extend parallel with the gate line, and the first and second data lines disposed at both sides of the unit pixel may have different line widths. A display device in accordance with another exemplary embodiment will be described with reference to the accompanying drawings. In the below-described exemplary embodiment, overlapping description, which has been explained in the foregoing exemplary embodiment, will be omitted. It is noted that description for the below-described exemplary embodiment is also applicable to the display device of the foregoing exemplary embodiment.

Figure 15:
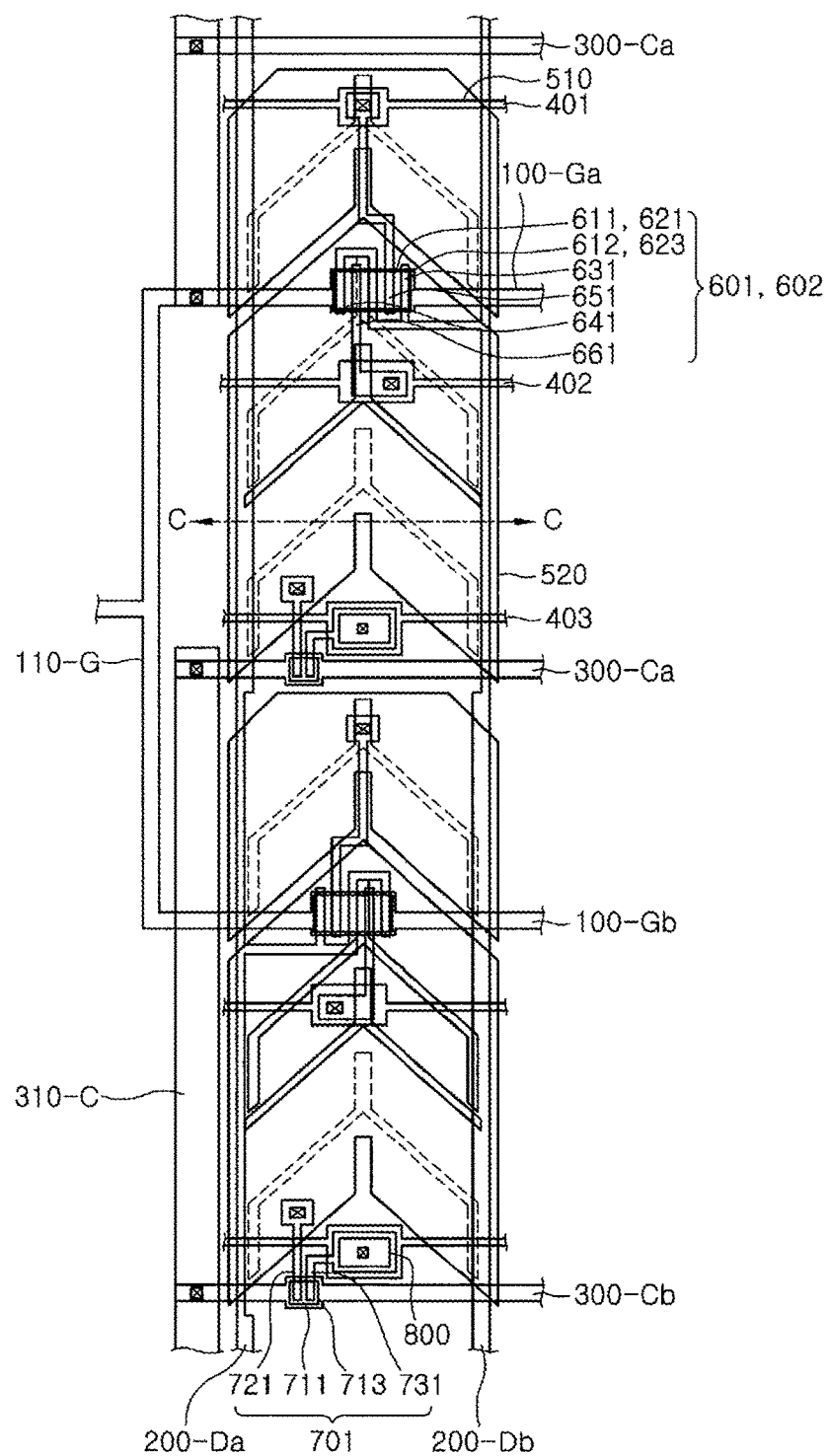
FIG. 15 is a plan view of a display device in accordance with another exemplary embodiment.
Figure 16:
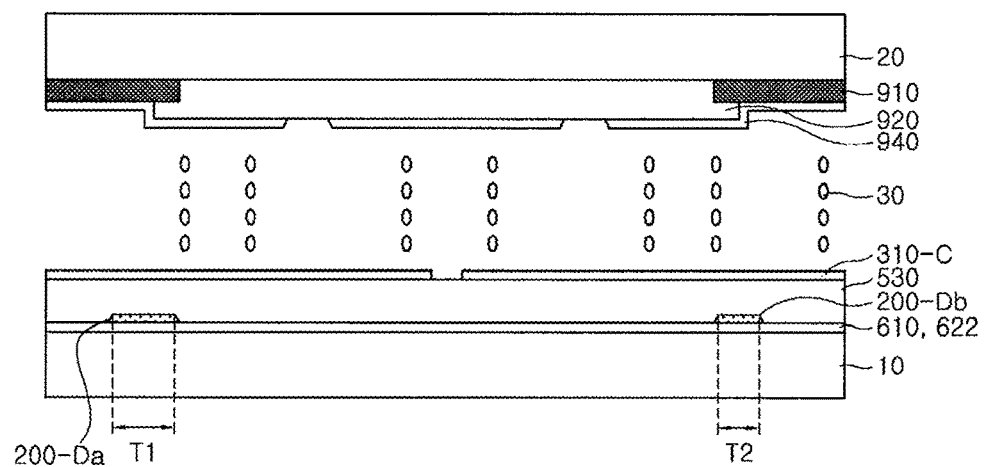
FIG. 16 is a cross-sectional view taken along line C-C of FIG. 15.

FIG. 15 is a plan view of a display device in accordance with another exemplary embodiment, and FIG. 16 is a cross-sectional view taken along line C-C of FIG. 15.

Referring to FIGS. 15 and 16, the display device in accordance with this exemplary embodiment includes first through third storage lines 401, 402 and 403 extending parallel with gate lines 100-Ga and 100-Gb. The first storage line 401 passes through a first sub pixel region, and the second and third storage lines 402 and 403 passes through a second sub pixel region. The first storage line 401 includes a first protrusion overlapping a first pixel electrode 510. The second storage line 402 includes a second protrusion overlapping a second pixel electrode 50. The third storage line 403 includes a third protrusion partially overlapping a charge control electrode 800. A drain terminal 651 of a first TFT 601, which is connected to the first pixel electrode 510 through a first pixel contact hole, is disposed on the first protrusion. Therefore, the capacitance of the first storage capacitor Cst1 is changed according to an overlapping area between the first protrusion and the drain terminal 651 of the first TFT 601. A drain terminal 661 of a second TFT 602, which is connected to the second pixel electrode 520 through a second pixel contact hole, is disposed on the second protrusion. Therefore, the capacitance of the second storage capacitor Cst2 is changed according to an overlapping area between the second protrusion and the drain terminal 661 of the second TFT 602. A drain terminal 731 of a charge control transistor 700, which is connected to the charge control electrode 800 through a contact hole, is disposed on the third protrusion. Therefore, the capacitance of the charge down capacitor Cdown is changed according to an overlapping area between the third protrusion and the drain terminal 731 of the charge down capacitor Cdown. The first through third storage lines 401, 402 and 403 of this exemplary embodiment are formed together with the gate lines 100-Ga and 100-Gb. The first through third storage lines 401, 402 and 403 are all connected to one side region of the substrate 10.

In this exemplary embodiment, the first and second data lines 200-Da and 200-Db overlap the first and second pixel electrodes 510 and 520. One of the first and second data lines 200-Da and 200-Db is connected to the source terminals 631 and 641 of the first and second TFTs 601 and 602 in one unit pixel. The line width of the data line connected to the source terminals 631 and 641 of the first and second TFTs 601 and 602 is made to be smaller than the line width of the data line to which the source terminals 631 and 641 are not connected, thus maintaining parasitic capacitance between the lines for transmitting data signals and the pixel electrode constantly. That is, in this exemplary embodiment, the parasitic capacitance can be maintained constantly by making overlapping areas between the pixel electrode and the lines for transmitting the data signals equal to each other in the unit pixel region. As illustrated in FIG. 15, since the first data line 200-Da positioned at a left edge of the upper unit pixel does not have an extended source terminal, it has parasitic capacitance corresponding to an overlapping area between the first data line 200-Da and the first and second pixel electrodes 510 and 520. However, a portion of the second data line 200-Db positioned at a right edge of the upper unit pixel region extends to form the source terminals 631 and 634. Therefore, the second data line 200-Db has parasitic capacitance corresponding to an overlapping area between the source terminals 631 and 634 and the first and second pixel electrodes 510 and 520 as well as the overlapping area between the second data line 200-Db and the first and second pixel electrodes 510 and 520. Thus, a line width T2 of the second data line 200-Db is made to be smaller than a line width T1 of the first data line 200-Da. Here, the line width T2 of the second data line 200Db may be made to be smaller than the line width T1 of the first data line 200-Da such that the parasitic capacitance decreases by the overlapping area between the source terminals 631 and 634 and the pixel electrodes 510 and 520. Alternatively, the line width T1 of the first data line 200-Da may be made to be greater than the line width T2 of the second data line 200-Db.

Likewise, since the second data line 200-Db positioned at a right edge of the lower unit pixel does not have an extended source terminal, it has parasitic capacitance corresponding to an overlapping area between the second data line 200-Db and the first and second pixel electrodes 510 and 520, as illustrated in FIG. 15. However, a portion of the first data line 200-Da positioned at a left edge of the lower unit pixel region extends to form the source terminals 631 and 634. Therefore, the first data line 200-Da has parasitic capacitance corresponding to an overlapping area between the source terminals 631 and 634 and the first and second pixel electrodes 510 and 520 as well as the overlapping area between the first data line 200-Da and the first and second pixel electrodes 510 and 520. Thus, the line width T1 of the first data line 200-Da is made to be smaller than the line width T2 of the second data line 200-Db.

That is, the line widths of the first and second data lines 200-Da and 200-Db are alternately narrowed because the first and second TFTs 601 and 602 of the unit pixel column are alternately connected to the first and second data lines 200-Da and 200-Db disposed at the left and right sides of the unit pixel.

The present invention is not limited to the aforesaid description. Therefore, the pixel electrode may be provided singularly in the unit pixel region, the pixel electrode of the upper region of the TFT may be cut out, and the charge control line may be formed between one pixel row and another pixel row adjacent to the one pixel row. A display device in accordance with still another exemplary embodiment will be described with reference to the accompanying drawings. In the below-described exemplary embodiment, duplicate description, which has been explained in the foregoing exemplary embodiments, will be omitted herein. It is noted that description for the below-described exemplary embodiment is also applicable to the display device in accordance with the foregoing exemplary embodiments.

Figure 17:
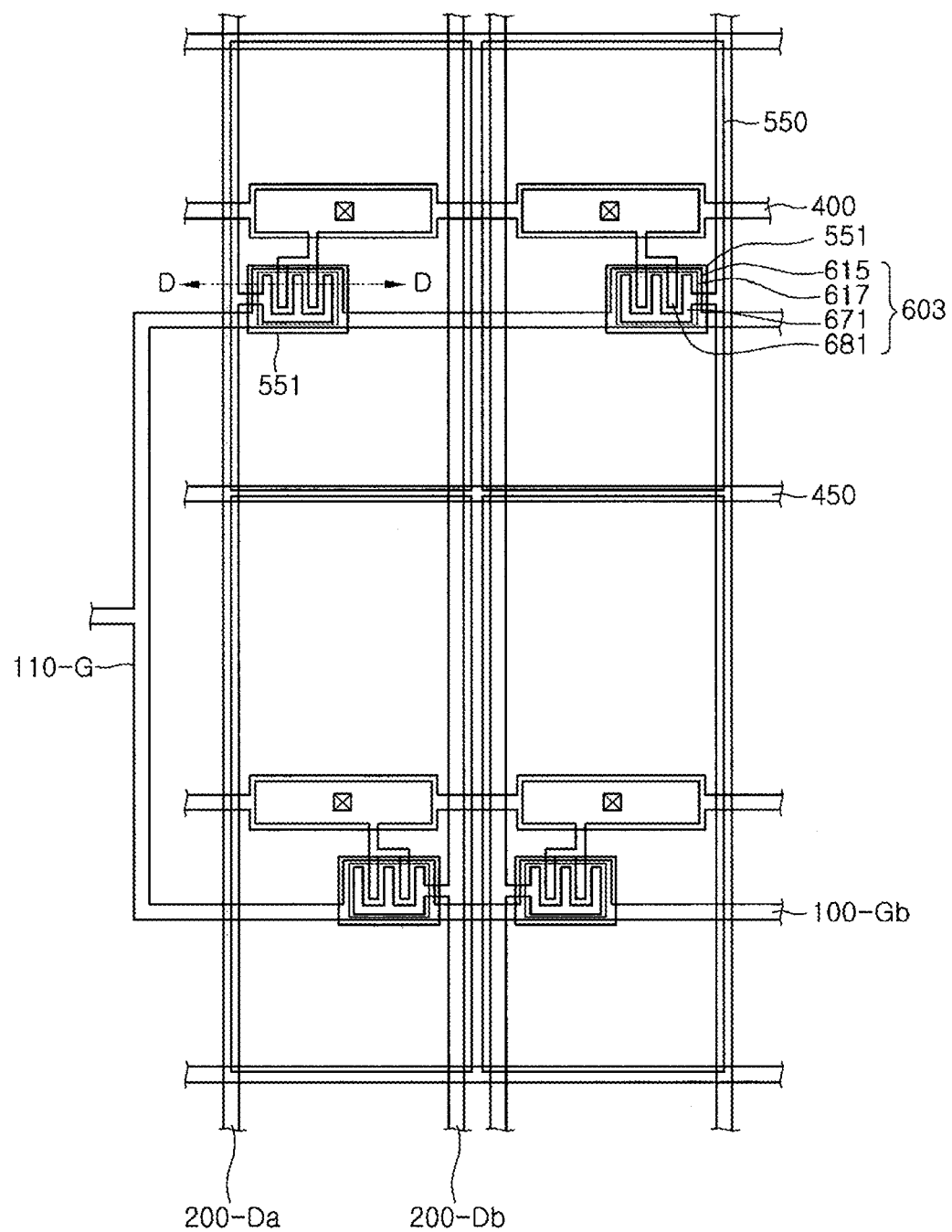
FIG. 17 is a plan view of a display device in accordance with still another exemplary embodiment.
Figure 18:
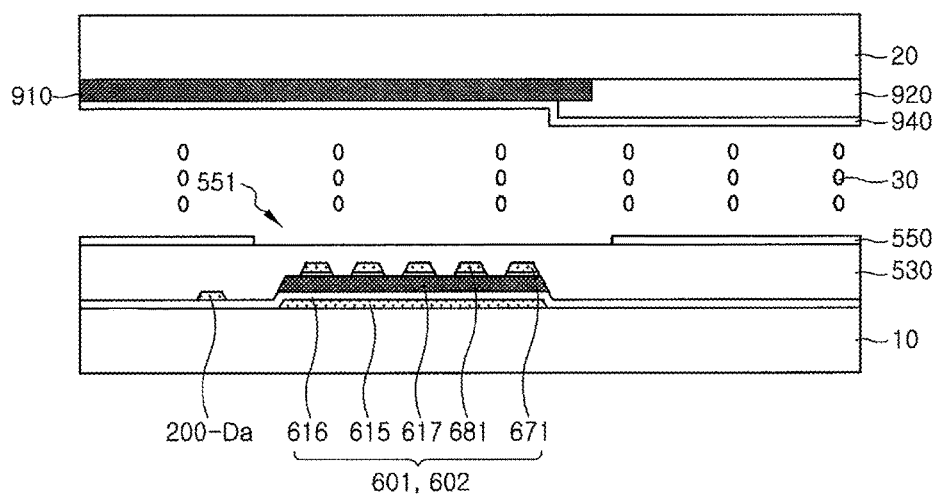
FIG. 18 is a cross-sectional view taken along line C-C of FIG. 17.

FIG. 17 is a plan view of a display device in accordance with still another exemplary embodiment, and FIG. 18 is a cross-sectional view taken along line C-C of FIG. 17.

Referring to FIGS. 17 and 18, the display device in accordance with this exemplary embodiment includes a TFT 603 connected to one of first and second data lines 200-Da and 200-Db and gate lines 100-Ga and 100-Gb, and a pixel electrode 550 connected to a drain terminal of the TFT 603. The pixel electrode 550 includes a cut-out groove 551 exposing a region over the TFT 603. The cut-out grove 551 may be formed in a rectangular shape, which is identical to that of the TFT 603, as illustrated in FIG. 17. Of course, the shape of the cut-out grove 551 is not limited to the rectangular shape, and thus the cut-out grove 551 may be formed by removing the pixel electrode 550 disposed over the source terminal 671 of the TFT 603. As described already, there is a difference in parasitic capacitance depending on an overlapping area between the pixel electrode and lines of transmitting data signals. To solve such a problematic phenomenon of parasitic capacitance difference, the cut-out groove 551 obtained by partially removing the pixel electrode 550 is provided over the TFT 603 in this exemplary embodiment, so that the source terminal 671 of the TFT 603 does not overlap the pixel electrode 550. Accordingly, it is possible to make the overlapping areas between the pixel electrode 550 and the first and second data lines 200-Da and 200-Db equal to each other, and thus to make parasitic capacitances between the pixel electrode 550 and the first and second data lines 200-Da and 200-Db equal to each other as well.

In this exemplary embodiment, the charge control line 450 is formed in a region between the pixel electrodes 550 vertically adjacent to each other, i.e., adjacent pixel electrodes arranged in a pixel column direction. Therefore, it is possible to prevent the pixel electrodes 550 vertically adjacent to each other in the pixel column direction from being coupled to each other, and also reduce parasitic capacitance occurring between the pixel electrodes 550 vertically adjacent to each other in the pixel column direction. The charge control line 450 is formed together with the gate line 100-Ga and 100-Gb and the storage line 400. The charge control line 450 is connected to the storage line 400 in one edge region of the substrate 10. Therefore, the charge control line 450 maintains its voltage level to a ground voltage level, which is a voltage level of the storage line 400. In the case where the charge control line 450 having the ground voltage level is separately disposed between two pixel electrodes 550, the charge control line 450 shields electric field, thereby reducing parasitic capacitance between adjacent pixel electrodes 550.

As described above, in accordance with the exemplary embodiments, even if the number of gate lines increases, a sufficient time to apply a gate turn-on voltage to the gate lines can be ensured by connecting at least two gate lines through a gate connection line for improving resolution.

In addition, in the exemplary embodiments, two charge control lines are connected through a charge connection line, the charge connection line is connected to a gate connection line in a next row of a pixel matrix, and amounts of charges in first and second sub pixels are adjusted, whereby visibility can be improved.

Furthermore, in accordance with the exemplary embodiments, the charge connection line is formed in a bridge shape, so that short-circuiting of the gate line and the charge connection line can be prevented.

Moreover, in accordance with the exemplary embodiments, a plurality of gate lines pass through a central region of the unit pixel to make parasitic capacitance between the plurality of gate lines and a pixel electrode uniform.

Additionally, in accordance with the exemplary embodiments, it is possible to make parasitic capacitance between data lines and a pixel electrode uniform by varying line widths of the data lines disposed at both sides of each unit pixel or by configuring the TFT and the pixel electrode not to overlap each other.

Further, in accordance with the exemplary embodiments, parasitic capacitance between adjacent pixel electrodes can be reduced by forming a charge control line in a region between the adjacent pixel electrodes.

The present disclosure provides a display device capable of ensuring a sufficient charging time as well as improving resolution (Full HD; 1,920×1,080 pixels or more) because two pixel rows can be simultaneously filled with charges by connecting a pair of gate lines through an external gate connection line.

The present disclosure also provides a display device capable of improving visibility by dividing a unit pixel into a plurality of sub pixels which are charged with different amount of charges from each other.

Although the display device has been described with reference to the specific embodiments, it is not limited thereto. Therefore, it will be readily understood by those skilled in the art that various modifications and changes can be made thereto without departing from the spirit and scope of the present invention defined by the appended claims.

The invention claimed is:
1. A display device, comprising:
a first unit pixel, a second unit pixel adjacent to the first unit pixel in a first direction, a third unit pixel adjacent to the second unit pixel in the first direction, a fourth unit pixel adjacent to the first unit pixel in a second direction crossing the first direction, and a fifth unit pixel adjacent to the second unit pixel in the second direction;
a first gate line extending in the second direction and electrically connected to the first unit pixel and the fourth unit pixel;
a second gate line extending in the second direction and electrically connected to the second unit pixel and the fifth unit pixel;
a third gate line extending in the second direction and electrically connected to the third unit pixel;
a first data line extending in the first direction and electrically connected to the first unit pixel and the third unit pixel;
a second data line extending in the first direction and electrically connected to the second unit pixel;
a third data line extending in the first direction and electrically connected to the fifth unit pixel;
a fourth data line extending in the first direction and electrically connected to the fourth unit pixel;
a first charge control line extending in the second direction and electrically connected to the first unit pixel and the fourth unit pixel;
a second charge control line extending in the second direction and electrically connected to the second unit pixel and the fifth unit pixel; and
a storage line configured to receive a ground voltage;
wherein the second data line and the third data line are disposed between the first unit pixel and the fourth unit pixel.

2. The display device of claim 1, wherein the first gate line and the second gate line simultaneously receive a gate turn-on voltage, and
wherein the first charge control line, the second charge control line and the third gate line receive the gate turn-on voltage only after the gate turn-on voltage is applied to the first gate line and the second gate line.

3. The display device of claim 2, wherein the first charge control line and the second charge control line receive the gate turn-on voltage through a gate turn-on voltage supply unit.

4. The display device of claim 1, wherein the first charge control line and the second charge control line simultaneously receive the gate turn-on voltage.

5. The display device of claim 4, wherein the first charge control line and the second charge control line are separated from the first gate line, the second gate line and the third gate line.

6. The display device of claim 4, wherein a stage unit electrically connected to at least one of the first gate line, the second gate line and the third gate line and separated from the gate turn-on voltage supply unit.

7. The display device of claim 1, wherein the fifth unit pixel is adjacent to the fourth unit pixel in the first direction.

8. The display device of claim 1, wherein each of the first unit pixel and the second unit pixel comprises a first sub pixel and a second sub pixel,
wherein the first charge control line and the second charge control line are connected to the second sub pixel of the first unit pixel and the second sub pixel of the second unit pixel, respectively.

9. The display device of claim 1, wherein each of the first unit pixel, the second unit pixel, the fourth unit pixel and the fifth unit pixel comprises a first sub pixel and a second sub pixel,
wherein the first charge control line is connected to the second sub pixel of the first unit pixel and the second sub pixel of the fourth unit pixel, and
wherein the second charge control line is connected to the second sub pixel of the second unit pixel and the second sub pixel of the fifth unit pixel.

10. The display device of claim 1, wherein the first gate line, the second gate line, the third gate line, the first charge control line and the second charge control line include a same material and are disposed on a same layer.

11. The display device of claim 10, wherein the storage line includes the same material and is disposed on the same layer.

* * * * *